United States Patent [19]

Pechnyo et al.

[11] 4,280,522
[45] Jul. 28, 1981

[54] FIRE SEAL FOR VALVES

[75] Inventors: Michael Pechnyo, Chicago, Ill.; Herman H. Fowler, Kearney, Nebr.

[73] Assignee: Rockwell International Corporation, Pittsburgh, Pa.

[21] Appl. No.: 140,027

[22] Filed: Apr. 14, 1980

[51] Int. Cl.³ .............................................. F16K 13/04
[52] U.S. Cl. ...................................... 137/72; 251/174; 251/315
[58] Field of Search .............. 137/72, 74; 251/315, 251/174, 172

[56] References Cited

U.S. PATENT DOCUMENTS

| 3,270,772 | 9/1966 | Rakus | 251/315 X |
| 3,346,234 | 10/1967 | Allen | 251/174 |
| 3,392,743 | 7/1968 | Pennington | 251/174 X |
| 3,504,885 | 4/1970 | Hulsey | 251/174 X |
| 3,583,426 | 6/1971 | Feres | 251/174 X |
| 3,990,465 | 11/1976 | Allen | 251/174 X |
| 4,105,040 | 8/1978 | Chester | 137/72 |
| 4,114,639 | 9/1978 | Cross | 251/174 X |

Primary Examiner—Harold W. Weakley

[57] ABSTRACT

A ball valve is disclosed having two seat rings on each side of the closure member. Each seat ring is operative independently of the other and each ring is sealed with respect to both the ball and with respect to the body independently of the other seat ring. One of the seat rings employs metallic fire resistant seals to seal with respect to both the body and the ball.

11 Claims, 4 Drawing Figures

FIRE SEAL FOR VALVES

BACKGROUND OF THE INVENTION

This invention relates to seating and sealing means for valves and is particularly concerned with providing means to seal the valve when the primary seal has been destroyed or rendered inoperative by abnormally high temperatures such as may be caused by a fire in the vicinity of the valve. The invention is particularly useful in valves employing a spherical closure member, hereafter referred to as "ball valves" of the type disclosed in U.S. Pat. No. 3,883,112. As shown there, such valves typically employ annular seat rings on either side of the closure member to prevent the leakage of fluid between the closure member and the body when the closure member is in closed position. A relatively resilient annular insert in the seat ring sealingly engages the ball to provide the primary seal with the ball. Usually such inserts are made from nylon, tetrafluoroethylene, or a like hard synthetic plastic material. A secondary sealing means is provided by the seat ring which has a spherical surface conforming to the curvature of the ball and which sealingly engages the ball. This seal is enhanced by the introduction of a flowable plastic lubricant into an annular groove in this surface. The plastic sealant also provides a lubricating function to minimize friction between the seat ring and the ball. A resilient O-ring of rubber or of a like elastomer is provided to seal between the seat ring and the body. Thus, the path between the seat ring and the ball and the path between the seat ring and the body are sealed against leakage.

The arrangement described above provides a reasonably effective seal under normal conditions. However, in the event of a fire near the valve, the resilient seal members which seal between the seat and the ball and the seat and the body would in all probability be subject to thermal damage. In large valves, the metal mass of the valve keeps the temperatures in the seal region low enough during fires of reasonable duration to assure satisfactory sealing performance. However, in smaller valves, non-metallic seals would be destroyed or rendered inoperative. The problem of seal destruction at high temperatures has long been recognized and prior efforts to solve this problem by providing fire resistant seals are shown in the U.S. patents to Allen, U.S. Pat. Nos. 3,346,234, and 3,990,465, and the patent to Calvert, U.S. Pat. No. 4,108,196. The patent to Calvert and both patents to Allen all disclose ball valves having supplementary fire seals. In each case, however, only one seat ring is employed and supplementary metallic seals are urged into sealing engagement between the body and the ring when the normally effective resilient rings are destroyed. In the patent to Allen, U.S. Pat. No. 3,346,234, a metallic ring 32 is urged into sealing engagement between a inclined surface on the seat ring and the body when the resilient, non-metallic rings 28 and 37 are destroyed. Similarly the patent to Allen, U.S. Pat. No. 3,990,465 provides a metallic backup ring 40 which is urged into sealing engagement between the seat and the body when the normally effective resilient seal ring 31 which is formed of teflon is destroyed. In the Calvert patent, "bushes" 15 and 18 are provided between the trunnions which are destructible by fire so that when these bushes are destroyed, the ball valve is allowed to move downstream into sealing engagement with the downstream ring thereby providing a metal to metal seal between the ball and the seat ring on the downstream side of the ball.

U.S. Pat. No. 3,504,885 to Hulsey, while not showing a fire resistant seal ring does show the concept of a separate backup seat ring and seal that limits leakage when the primary seal ring and seat fails. While both patents to Allen and the patent to Calvert do attempt to provide a fire resistant seating-sealing arrangement, they utilize a single seat ring with which the backup sealing ring acts in conjunction to provide a secondary seal in case the primary seal is destroyed. While the use of a single seat ring may be feasible in the larger size valves, in the smaller size valves, any attempt to provide both a primary seal and a secondary seal between the seat ring and the ball and the seat ring and the body renders the seat ring somewhat unnecessarily bulky and complicated. While ball valve seat rings are usually formed of metal, the rings must be able to flex sufficiently to insure an extremely close fit between the ball and the sealing surface on the seat ring. In smaller sized valves excessive bulk in relation to the size of the valve will result in a ring which is not able to flex sufficiently Accordingly, it is an object of the present invention to provide a seal arrangement for valves which will function even when exposed to elevated temperatures.

It is a more specific object of the present invention to provide a secondary seat ring in addition to the usual conventional seat ring which will provide an effective sealing function in the event the primary or the conventional seat ring and seal fails to function.

It is a further object of this invention to provide dual closely associated seat rings, one of which is effective to seal the ball with respect to the seat ring and the seat ring with respect to the body at elevated temperatures.

It is still another object of this invention to provide a seating-sealing arrangement for a ball valve which is made of fire resistant materials.

Other objects of this invention will appear as the following description proceeds.

DESCRIPTION OF THE PREFERRED EMBODIMENT

Figure 1:
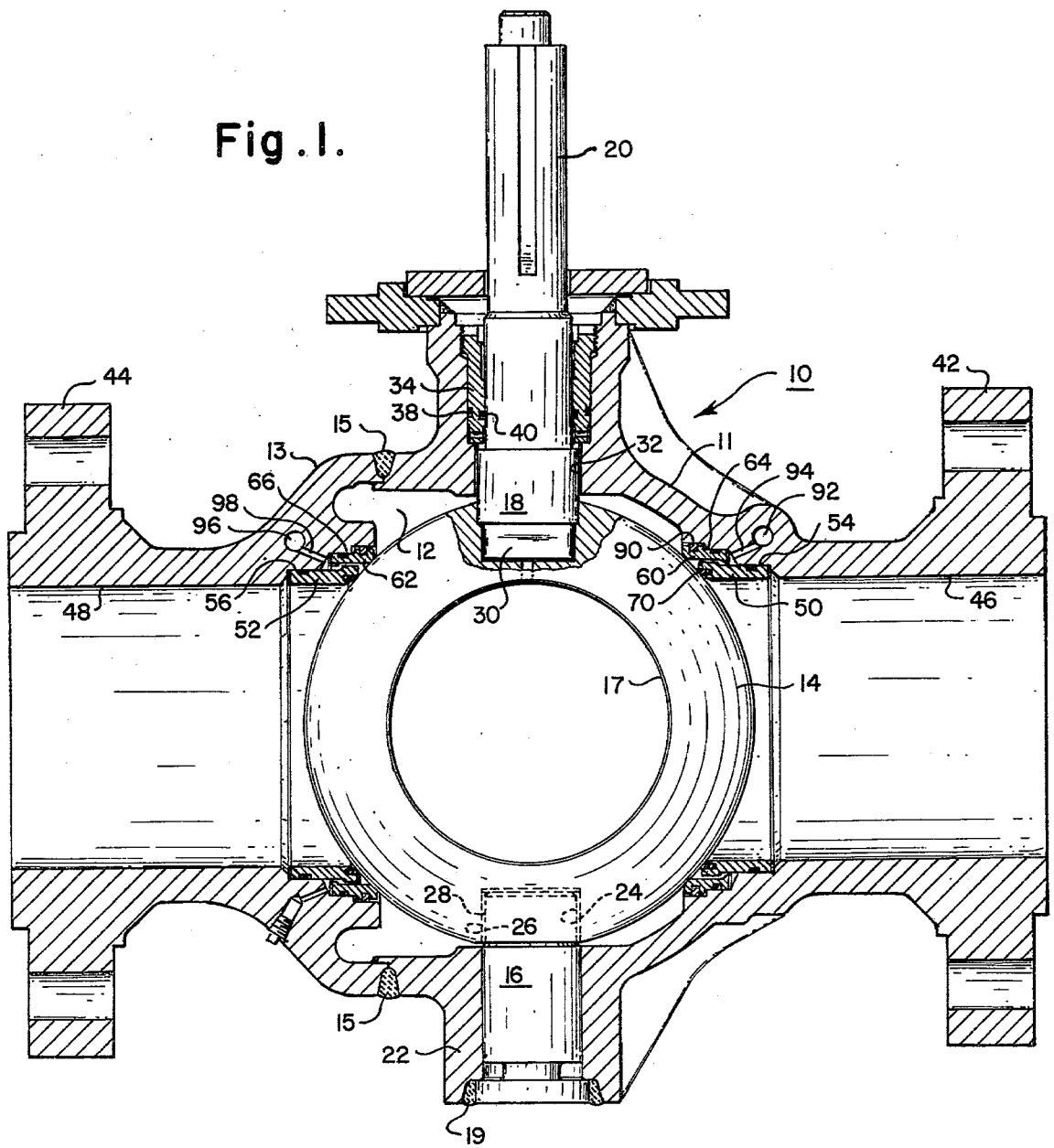
FIG. 1 is a cross-sectional elevation view of a ball valve employing the invention herein described and in which the closure member or the ball is shown in closed position.

Referring to the drawings, particularly FIG. 1, a valve body generally indicated by the numeral 10 which is comprised of a main body member 11 and an end member 13 welded together as at 15. Body member 11 and 13 respectively have flanges 42 and 44 for connection into a pipeline. Inlet/outlet passages 46 and 48 are provided in main body member 11 and end body member 13 respectively. Body 10 contains a cavity or chamber 12 within which a spherical closure member or ball 14 is mounted for rotary movement between an open and a closed position by means of lower trunnion 16 and upper trunnion portion 18 which is formed integrally on the lower end of stem 20. The ball has a through passage 17 which connects passages 46 and 48 in valve open position. Lower trunnion 16 is fixed against rotation in a boss 20 which projects from the lower portion of main body member 11 and has a cylindrical bearing portion 24 which projects into a mating cylindrical recess formed in the bottom of the ball 14. A cylindrical bearing 28 is interposed between the bearing portion 24 and the recess 26 to allow the ball 14 to turn freely about the axis of trunnions 16 and stem 20. Trunnion 16 is welded to boss 22 as shown at 19 to seal the trunnion and boss against leakage between the two.

Formed integrally on the bottom of stem 20 beneath trunnion portion 18 is a tang 30 having a rectangular cross section and which projects into a mating rectangular recess in the upper portion of the ball 14. The upper trunnion portion 18 is journalled for rotation in the cylindrical bearing portion 32 formed in the upper part of body portion 11. Thus, as the stem 20 is rotated about its axis, the tang 30 projecting into a similarly shaped recess in the ball 14 causes the ball 14 to rotate on bearing portion 24 in trunnion 16. A packing gland 34 around stem 20 is threaded into an enlarged cylindrical opening in main body member 11 and carries O-rings 38 and 40 to seal the gland with respect to the body and the gland with respect to the stem. A wrench, gearing unit or actuator (not shown) is mounted on top of body 10 and is drivingly connected to stem 20 to rotate the stem and ball 90° between open and closed position.

Annular seat rings 50 and 52 are mounted on diametrically opposed sides of ball 14 for limited axial movement in cylindrical recesses 54 and 56 which circumscribe the end portions of inlet/outlet passages 46 and 48 respectfully. A second set of seat rings 60 and 62 are mounted for limited axial movement in stepped cylindrical bores 64 and 66.

Figure 2:
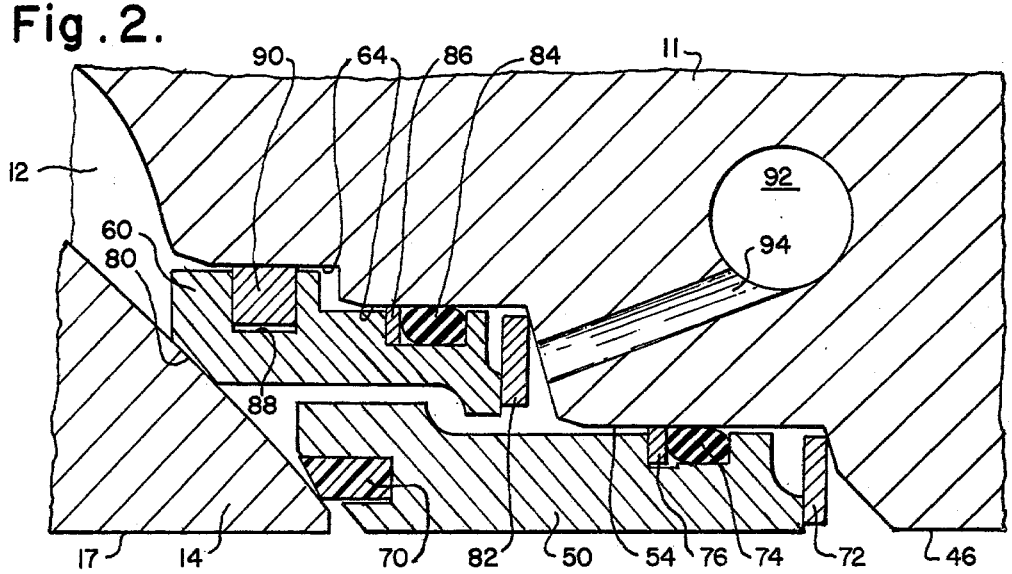
FIG. 2 is an enlarged cross section showing the details of the construction in the region of the body, the seat rings, and the ball.
Figure 3:
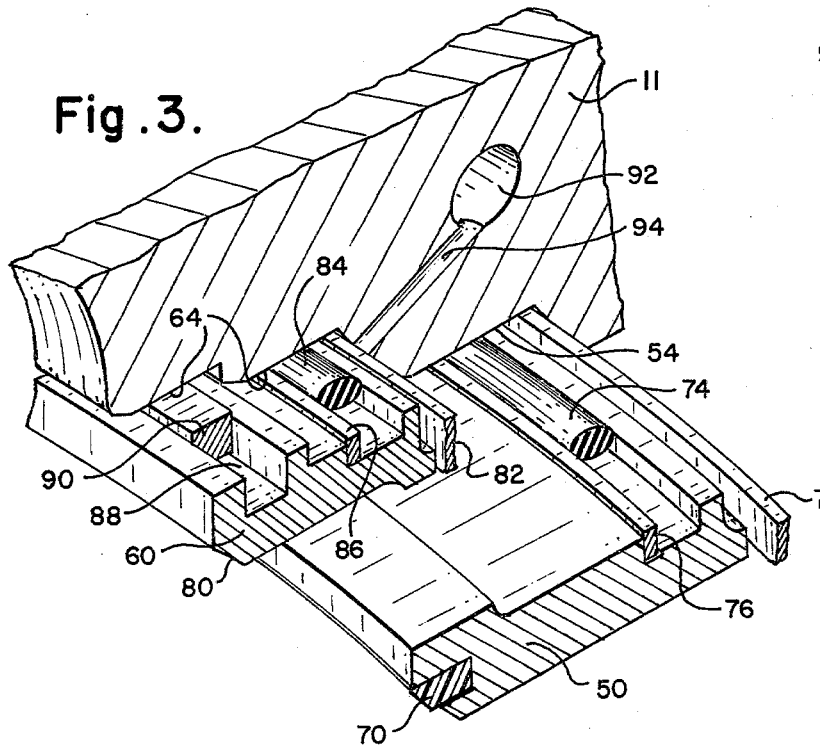
FIG. 3 is a perspective view of the arrangement shown in FIG. 2.

The details of the right hand set of seat rings 50 and 60 are shown in FIGS. 2 and 3. As shown there, metal seat ring 50, is mounted for limited axial movement within cylindrical recess 54 formed within the main body member 11. An annular sealing member 70 is mounted in a groove formed in the face of seat ring 50 which adjoins ball 14. Sealing ring 70 is preferably made of a plastic such as nylon impregnated with a solid phase lubricant.

Annular spring member 72 is interposed between the opposite end of seat ring 50 and a shoulder formed in the interior of body member 11 and serves to bias the seat ring toward the ball 14 and the sealing ring 70 into sealing engagement with the ball 14. An annular seal ring 74 formed of a suitable elastomer is mounted in a groove in the outer periphery of ring 50 to provide a seal between the seat ring and the body. Backup ring 76 also mounted in the same groove as the seal ring 74 prevents upstream fluid pressure from extruding the seal ring into the space between the seat ring 50 and the body member 11.

A second seat ring 60 also made of metal or similarly fire resistant material is mounted for limited axial movement within stepped cylindrical recess 64 in circumscribing relationship to seat ring 50. Seating surface 80 on seat ring 60 is formed with the same curvature as the exterior surface of the ball 14 and provides a metal to metal seal between the ball and this seat ring. A second annular spring 82 is interposed between the opposite end of seat ring 60 and a shoulder formed on the inner surface of body member 11 to bias the seat 60 toward the ball and the sealing surface 80 into sealing engagement with the exterior of the ball. As in the case of seat ring 50, seat ring 60 is provided with a resilient annular seal 84 and backup ring 86 to provide a seal between the seat ring 60 and the body member 11.

Figure 4:
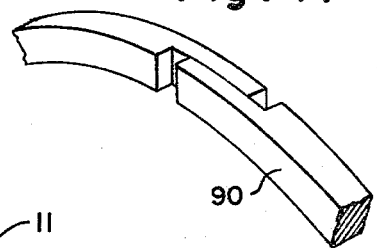
FIG. 4 shows a perspective view of a fire resistant seal ring employed in the instant invention.

Additionally, seat ring 60 has formed around its outer periphery a groove 88 in which is received an additional seal ring 90, which is similar to a piston ring and is made of metal or other suitable fire resistant material. The ring 90 is similar to a piston ring in that it has ends that fit together in a sealing and sliding relationship as shown in FIG. 4 and in its free condition may be expanded so as to be received over the outer periphery of the ring 60 and snapped into annular groove 88. Also, its free outer diameter in its free condition is slightly larger than the adjoining interior surface of stepped bore 64 so that in the assembly, the ring 90 tends to expand against and into sealing engagement with the surface of the stepped bore 64. The relative width of groove 88 and the width of ring 90 are such as to provide a close fit and, therefore, a sealing relationship between the ring and the pressure-loaded side of the groove 88.

Passages 92 and 94 in body member 11 provide a means of introducing a flowable plastic sealant into the space between the seat rings 50 and 60. Referring to FIG. 1 similar passages 96 and 98 provide means for introducing the flowable plastic sealant into the space between seat rings 52 and 62. The plastic sealant may be injected into passage 92 under pressure by means of fittings well known in the art such as that shown and described in the aforementioned U.S. Pat. No. 3,883,112. The plastic sealant not only augments the seal between the seat rings 50 and 60 and the ball, but also lubricate the surfaces on the seat rings and the ball which are in contact to thereby minimize the torque necessary to turn the ball.

As mentioned above, annular spring 72 urges the seal ring 70 into sealing engagement with the ball 14 and seal ring 74 provides a fluid-tight seal between the outer surface of seat ring 50 and the body 11. If the passage 46 is the inlet passage, when the ball 14 is in closed postion as shown in FIG. 1, fluid pressure acts on the right hand end of the seal ring 50 to augment the force of spring 72 urging the seal ring 70 into even closer sealing engagement with the ball. Thus, a pressure actuated seal is provided so that as the pressure in the pipeline increases, the sealing effort is similarly increased.

It is possible that even under normal operating conditions some fluid may leak through scratches in the seal ring 70 in seat ring 50 and the body member 11. In this case any pressure produced by such leakage would act against the right hand end of the seat ring 60 further urge it into sealing engagement with the exterior surface of the ball 14. In this case, both the seal rings 84 and the seal ring 90 would operate to prevent the leakage of fluid between the seat ring 60 and the body member 11. Thus, even under normal operating conditions, the seat ring 60 provides an additional seal to minimize the leakage of fluid between the ball 14 and the body member 11.

In the event that the valve is subjected to elevated temperatures over and above its normal range of operating temperatures such as by a fire in the vicinity of the valve, one or all of the seal rings 70, 74 and 84 may be destroyed or rendered inoperative. In this case, since both the seat ring 60 and the seal ring 90 are metallic and, therefore, resistant to high temperatures, the seat ring 60 will nevertheless remain sealed with respect to the body member 11 by seal ring 90 and with respect to the ball 14 by the sealing surface 80 on the seat ring 60. It can, therefore, be appreciated from the foregoing that the instant invention provides a secondary backup seat ring and seaing arrangment which not only augments the seal provided by the primary seat ring 50 under normal operating conditions, but which in the event of a fire or other phenomena which may destroy the primary seal, provides an effective seal between the ball and the body when the primary seals fail to function.

The invention herein described may be embodied in other specific forms without departing from the spirit or essential characteristics thereof. The present embodiment is, therefore, considered to be in all respects as illustrative and not restrictive, the scope of the invention being indicated by the appended claims and all departures from the foregoing description which come within the meaning and range of equivalency of the claims are, therefore, intended to be embraced therein.

What is claimed and desired to be secured by Letters Patent is:

1. In a valve, a housing having fluid passages, a closure member movable between a closed position where fluid communication between said passages is interrupted and an open position where said passages are connected, a first seat ring within said housing surrounding one of said passages, resilient annular seal means between said first seat ring and the interior of said housing to prevent the passage of fluid therebetween, annular seal means between said first seat and said closure member to prevent the passage of fluid therebetween, a second seat ring of fire resistant material within said housing adjacent said first seat ring and having an annular sealing surface in engagement with said closure member, and fire resistant sealing means between said second seat ring and the interior of said body.

2. The invention defined in claim 1 in which the sealing means between said first seat and said body and the sealing means between said first seat and said closure member are destructible by abnormally high temperatures.

3. The invention defined in claim 2 in which the annular sealing means on second seat ring is comprised of an uninterrupted annular surface formed integral on said seat ring which closely conforms to the shape of the adjacent surface of said closure member.

4. The invention defined in claim 1 together with means for biasing said first seat ring and said resilient sealing means into engagement with said closure member and fire resistant biasing means for biasing said second seat ring into engagement with said closure member.

5. The invention defined in claim 1 in which said fire resistant sealing means between said second seat ring and the interior of said body is metal.

6. The invention defined in claim 1 together with means for introducing a flowable plastic sealant between said first seat ring and this closure member.

7. In a ball valve, a metallic housing having an interior chamber and opposed aligned inlet/outlet passages opening into said chamber, a spherical closure member mounted in said chamber for movement between a valve open and a valve closed position, a first annular seat ring within said housing adjacent at least one of said passages, an annular sealing ring on said first seat ring for sealing the said first seat ring with respect to said closure member, sealing means for sealing said first seat ring with respect to the interior surface of said housing, a second seat ring having an annular surface for sealing engagement with the surface of said closure member, sealing means for sealing said second seat ring with respect to the interior surface of said housing, said second seat ring and said last mentioned sealing means being formed of material which is resistant to deterioration at temperatures above the normal range of operating temperatures of said valve.

8. The invention defined in claim 7 in which said second seal ring and said last mentioned sealing means are metal.

9. The invention defined in claim 7 together with separate biasing means for each of said first and second seat rings for biasing each of said seat rings toward engagement with the surface of said closure member, the biasing means for said second seat ring being formed of a material which is resistant to deterioration a temperature above the normal operating range of temperatures of said valve.

10. The invention defined in claim 8 in which said first mentioned sealing means is formed of a material which is subject to deterioration at temperatures above the normal operating range of temperatures of said valve.

11. The invention defined in claim 10 together with means for introducing a flowable plastic sealant between the adjoining surface on said first and second seat rings and said closure member.

* * * * *